US011010694B2

(12) United States Patent
Gross et al.

(10) Patent No.: US 11,010,694 B2
(45) Date of Patent: May 18, 2021

(54) OPTIMALLY DEPLOYING UTILITY REPAIR ASSETS TO MINIMIZE POWER OUTAGES DURING MAJOR WEATHER EVENTS

(71) Applicant: Oracle International Corporation, Redwood Shores, CA (US)

(72) Inventors: Kenny C. Gross, Escondido, CA (US); Andrew I. Vakhutinsky, Sharon, MA (US); DeJun Li, El Monte, CA (US); Bradley R. Williams, Brush Prairie, WA (US); Sungpack Hong, Palo Alto, CA (US)

(73) Assignee: Oracle International Corporation, Redwood Shores, CA (US)

( * ) Notice: Subject to any disclaimer, the term of this patent is extended or adjusted under 35 U.S.C. 154(b) by 346 days.

(21) Appl. No.: 15/938,988

(22) Filed: Mar. 28, 2018

(65) Prior Publication Data

US 2019/0303810 A1    Oct. 3, 2019

(51) Int. Cl.
*G06Q 10/04* (2012.01)
*G06Q 50/06* (2012.01)
*G06Q 10/00* (2012.01)
*H02J 3/00* (2006.01)

(52) U.S. Cl.
CPC ............. *G06Q 10/04* (2013.01); *G06Q 10/20* (2013.01); *G06Q 50/06* (2013.01); *H02J 3/001* (2020.01)

(58) Field of Classification Search
CPC .................................................... G06Q 10/04
See application file for complete search history.

(56) References Cited

U.S. PATENT DOCUMENTS

| 9,297,723 | B1 * | 3/2016 | Hofmann | G01M 99/00 |
|---|---|---|---|---|
| 10,445,673 | B1 * | 10/2019 | Hofmann | G06Q 50/06 |
| 2014/0324351 | A1 * | 10/2014 | Dannevik | G01W 1/00 |
| | | | | 702/3 |
| 2017/0006135 | A1 * | 1/2017 | Siebel | G06F 8/10 |
| 2017/0116091 | A1 * | 4/2017 | Anderson | H04L 41/0806 |

* cited by examiner

*Primary Examiner* — Kurtis Gills
(74) *Attorney, Agent, or Firm* — Park, Vaughan, Fleming & Dowler LLP

(57) ABSTRACT

The disclosed embodiments relate to a system that facilitates deployment of utility repair crews to nodes in a utility network. During operation, the system determines a node criticality for each node in the utility network based on a network-reliability analysis, which considers interconnections among the nodes in the utility network. The system also determines a node failure probability for each node in the utility network based on historical weather data, historical node failure data and weather forecast information for the upcoming weather event. The system uses the determined node criticalities and the determined node failure probabilities to determine a deployment plan for deploying repair crews to nodes in the utility network in preparation for the upcoming weather event. The system then presents the deployment plan to a person who uses the deployment plan to deploy repair crews to be available to service nodes in the utility network.

20 Claims, 16 Drawing Sheets
(6 of 16 Drawing Sheet(s) Filed in Color)

$$x = c_1 x_1 + c_2 x_2 + c_3 x_3$$

$$y = c_1 y_1 + c_2 y_2 + c_3 y_3$$

$$\begin{pmatrix} x_1 & x_2 & x_3 \\ y_1 & y_2 & y_3 \\ 1 & 1 & 1 \end{pmatrix} \vec{c}_3 = \begin{pmatrix} x \\ y \\ 1 \end{pmatrix}$$

$$\vec{c}_3 = \begin{pmatrix} c_1 \\ c_2 \\ c_3 \end{pmatrix}$$

OPTIMALLY DEPLOYING UTILITY REPAIR ASSETS TO MINIMIZE POWER OUTAGES DURING MAJOR WEATHER EVENTS

BACKGROUND

Field

The disclosed embodiments generally relate to techniques for deploying utility repair crews to respond to upcoming weather events. More specifically, the disclosed embodiments provide a system that optimizes the deployment of repair crews to effectively respond to upcoming weather events based on historical weather and failure data, and also utility network interconnectivity and redundancy considerations.

Related Art

During severe storm events, a utility company typically relies on a person working in an emergency response center (ERC) to monitor evolving conditions through a region served by the utility, and to dispatch repair crews as necessary to restore power when nodes or power lines go down. Existing techniques for utility restoration management are very human-intensive. ERC personnel typically operate by "detecting and reacting" to node and line outages. Even though they can view a utility grid map to see where failures arise, their initial assessment of impact is most commonly inferred from the density of incoming phone calls from utility customers. As events unfold, an ERC director makes decisions in real-time based on weather predictions to call in distant repair crews. This means that resource management during weather events is based on human knowledge, experience, and also subjective judgments.

Moreover, utilities generally "share" repair crews with other nearby and distant utilities. This means that the process of dispatching repair crews often involves pulling in distant repair crews from other utilities, which costs significantly more than dispatching the utility's own repair crews. If an ERC director calls in too few repair crews during a major weather event, utility customers can suffer extended blackouts. This leads to bad press, and possibly consequences from regulators. In this case, during the next major weather event, the ERC director will tend to call in many more repair crews, which can lead to over-allocation of repair crews. Conversely, if the ERC director calls in too many repair crews during a major weather event, this can result in a huge cost to the utility for having too many repair crews with no work to do. In this case, the ERC director will tend to call in many fewer repair crews during the next major weather event, which can lead to under-allocation of repair crews. This tendency of an ERC director to subjectively over-allocate and under-allocate repair crews based on previous bad experiences is known as the "bullwhip effect."

Hence, what is needed is a technique for allocating repair crews during major weather events, which mitigates the above-described subjectivity inherent in the human decision-making process.

SUMMARY

The disclosed embodiments relate to a system that facilitates deploying utility repair crews to nodes in a utility network in preparation for an upcoming weather event. During operation, the system determines a node criticality for each node in the utility network based on a network-reliability analysis, which considers interconnections among the nodes in the utility network. The system also determines node failure probabilities for nodes in the utility network based on historical weather data, historical node failure data and weather forecast information for the upcoming weather event. Next, the system uses the determined node criticalities and the determined node failure probabilities to determine a deployment plan for deploying repair crews to nodes in the utility network in preparation for the upcoming weather event. Finally, the system presents the deployment plan to personnel in an emergency response center who use the deployment plan to deploy repair crews to be available to service nodes in the utility network.

In some embodiments, the deployment plan deploys repair crews to critical nodes that are likely to fail.

In some embodiments, the deployment plan deploys repair crews to nodes in a manner that minimizes an expected criticality of nodes that are not covered by a repair crew.

In some embodiments, determining the node failure probabilities for nodes in the utility network involves: determining a susceptibility of the nodes in the utility network to weather-induced failures based on the historical weather data and the historical node failure data; determining a node-specific weather forecast for each node in the utility network based on the historical weather forecast information; and determining the node failure probability for each node in the utility network based on the node-specific weather forecast for the node and the susceptibility of the node to a weather-induced failure.

In some embodiments, determining the susceptibility of the nodes in the utility network to weather-induced failures involves: using the historical failure data to compute a derivative of a Mean Cumulative Function (dMCF) for the nodes in the utility network with respect to time; and correlating the dMCF with the historical weather data to determine the susceptibility of the nodes in the network to weather-induced failures.

In some embodiments, the dMCFs are computed separately for each different type of node, and the susceptibilities to failures are computed separately for each different type of node.

In some embodiments, the different types of nodes in the utility network include: generating plants; transmission lines; and transformers.

In some embodiments, the weather forecast information comprises specific weather forecasts for geographically distributed weather feed locations.

In these embodiments, determining the node-specific weather forecast for the node based on the weather forecast information involves: using the barycentric coordinates technique (BCT) to determine a smallest bounding triangle defined by three weather feed locations surrounding the node; and computing the node-specific weather forecast for the node by weighting specific forecasts for each of the three surrounding weather feed locations.

In some embodiments, if the node is not surrounded by a bounding triangle of weather feed locations, the system computes the node-specific weather forecast for the node by weighting specific forecasts for each of one or two nearest weather feed locations.

In some embodiments, the node criticality for each node is determined based on: how many paths from a power source to any other node pass through the node; and how many nodes become disconnected from a power source if the node fails.

BRIEF DESCRIPTION OF THE FIGURES

The patent or application file contains at least one drawing executed in color. Copies of this patent or patent application publication with color drawing(s) will be provided by the Office upon request and payment of the necessary fee.

FIG. 7 illustrates associated matrix notations in accordance with the disclosed embodiments.

DETAILED DESCRIPTION

Figure 1:
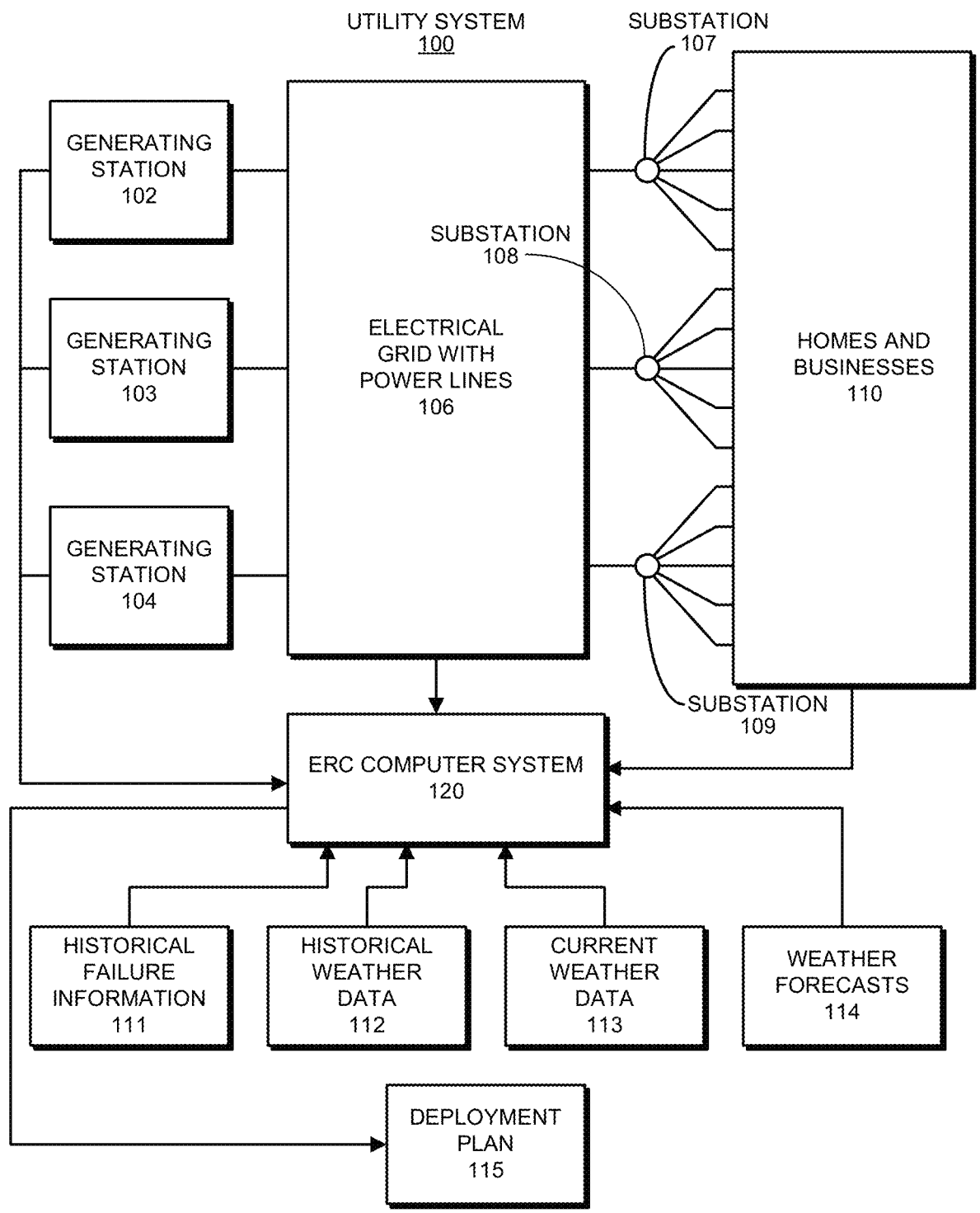
FIG. 1 illustrates an exemplary utility system in accordance with the disclosed embodiments.

The following description is presented to enable any person skilled in the art to make and use the present embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the present embodiments are not limited to the embodiments shown, but are to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Overview

The disclosed embodiments provide a technique that uses machine-learning technology to reduce the adverse effects of human subjectivity while proactively deploying utility repair crews to nodes in a utility network. This is accomplished by intelligently mining historical records for weather predictions and asset operability during storm events, and then generating optimal predictions for future storm events to facilitate deployment of repair crews in a manner that minimizes restoration times and also minimizes cost-penalties for over-predicting or under-predicting repair-crew requirements. This facilitates optimally directing those repair crews to assets that will restore power to the largest groups of impacted customers in a timely manner.

During operation, the disclosed system mines historical asset databases and extracts asset failure times and time-stamps. Note that these historical asset databases can be fairly large because a typical utility system can have more than 1,000 assets in its generation and distribution network. The disclosed system also mines fine-grained weather features from distributed weather feeds located throughout the geographical region served by the utility.

This historical data is then analyzed using a machine-learning technique to generate recommendations about how to best deploy repair crews to different assets in advance of an upcoming weather event. During this process, the new technique first derives weather-driven failure probabilities for assets by performing a Mean Cumulative Function (MCF) analysis, which is described in more detail below. (Note that MCF analyses have been used in the past to track failure rates for server components in data centers, but never before for inferring weather-induced failure probabilities for utility system assets.) The new technique also infers the "rate of change" in failure probabilities by using a moving-window numerical derivative of the MCF, which we call the "dMCF," and then correlates the dMCF to a multivariate weather-intensity metric.

The technique uses the foregoing MCF and dMCF processes in a new framework that employs the barycentric coordinates technique (BCT) to compute a triangularized weather-weighting function, which quickly identifies the closest triangle of weather feeds surrounding each asset, and then provides a trivariate weighting function for each weather feed in proximity to each asset. This iterative process generates failure probabilities in the form of risk indices (RIs) for each asset during upcoming storm events.

As a final step, the system superimposes the RIs onto a "network reliability importance" framework, and then provides a utility emergency response center team with information about where to focus limited (and costly) repair crews to minimize overall outage-restoration costs, and to restore power to the largest blackout regions in the shortest amount of time.

This new machine-learning-based system helps utilities to not over-estimate or under-estimate the number of repair crews to call in for major weather events, and to thereby avoid problems arising from the subjectivity of human judgment.

MCF Analysis

Figure 2A:
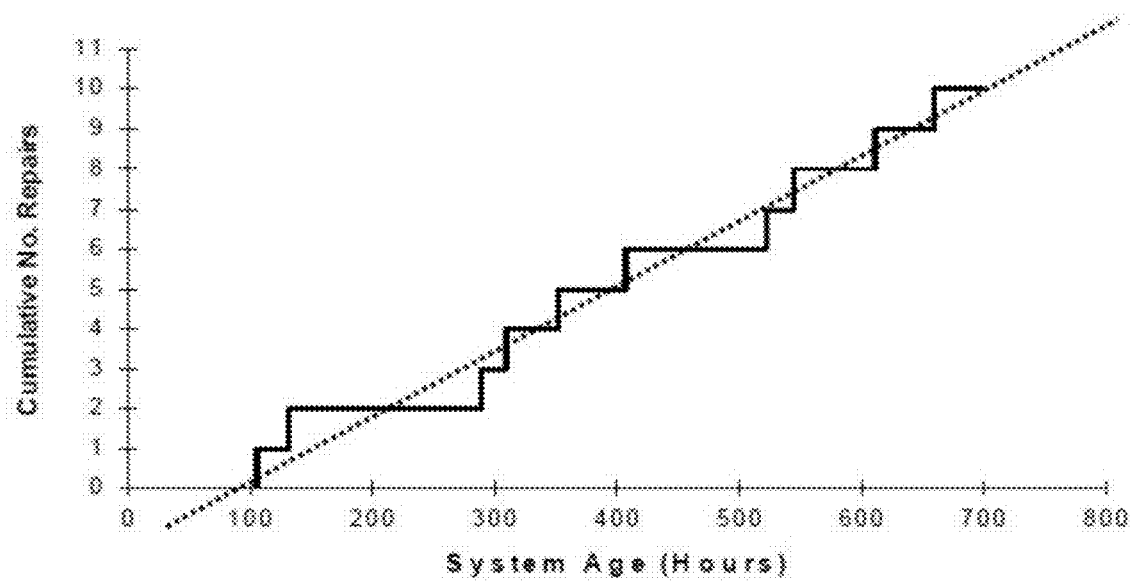
FIG. 2A presents a graph illustrating cumulative repairs versus system age in accordance with the disclosed embodiments.
Figure 2B:
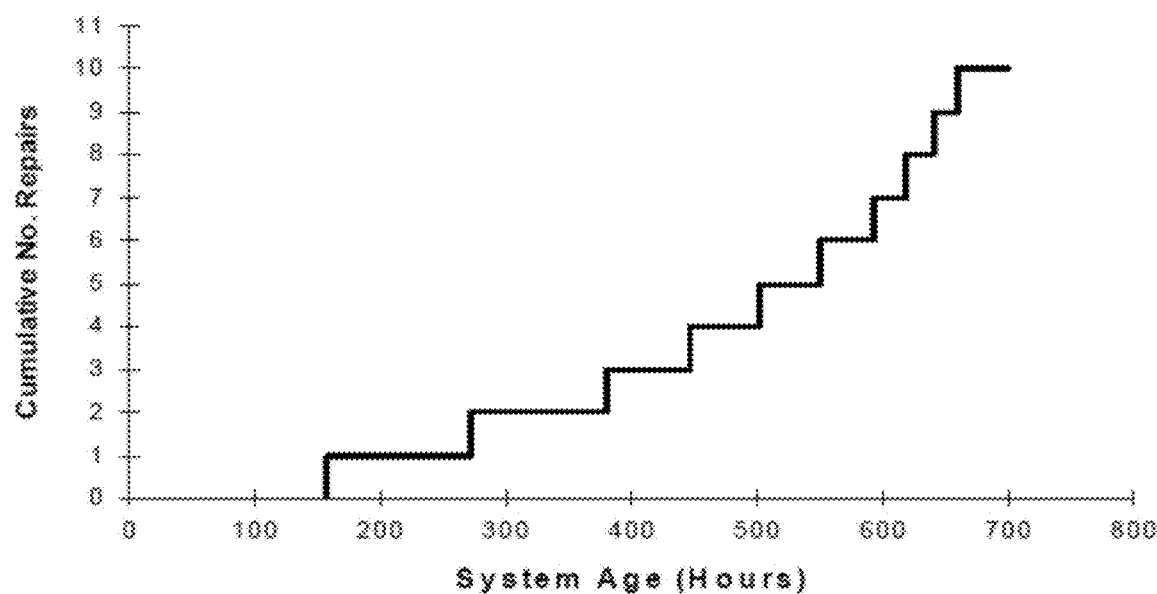
FIG. 2B presents a graph illustrating cumulative repairs versus system age when failures are increasing with time in accordance with the disclosed embodiments.
Figure 2C:
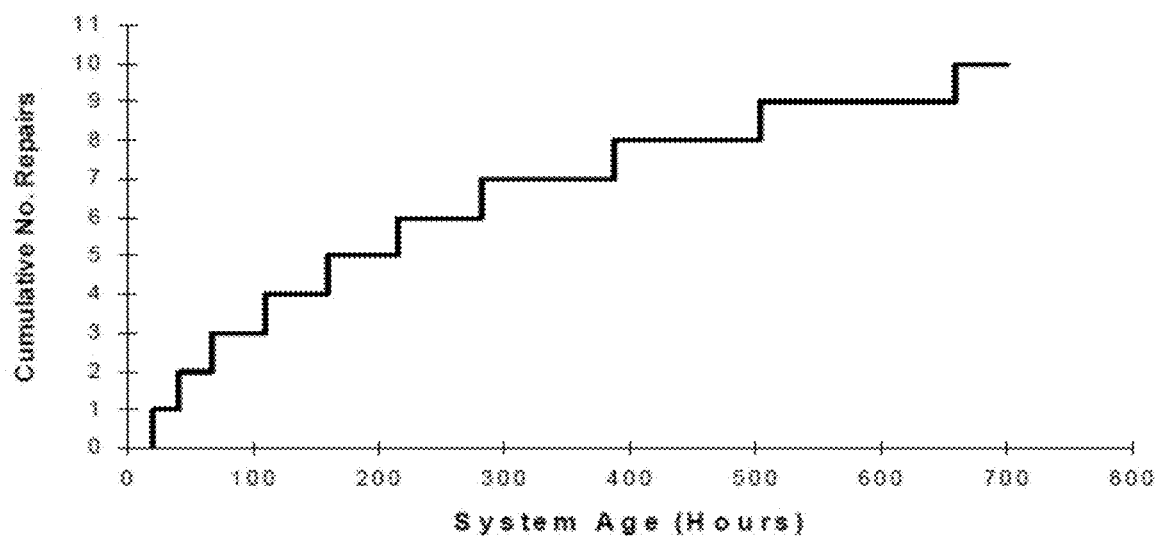
FIG. 2C presents a graph illustrating cumulative repairs versus system age when failures are increasing with time in accordance with the disclosed embodiments.

During the above-described MCF analysis, we plot cumulative counts per day of asset failures, and call this curve the Mean Cumulative Function (MCF). For example, FIG. 2A illustrates an exemplary MCF curve for a small population of reparable assets. From reliability theory we know that if asset and component failures are random in time, which happens with utility assets for "blue sky" failures that are not due to external stress factors such as harsh weather, the MCF curve follows a straight line as is illustrated by the dashed line in FIG. 2A. In contrast, during time periods when failures are increasing with time, the MCF curve becomes concave upwards as is illustrated in FIG. 2B. On the other hand, when failure rates in the monitored population decrease with time, the MCF becomes concave downward as is illustrated in FIG. 2C.

Figure 3A:
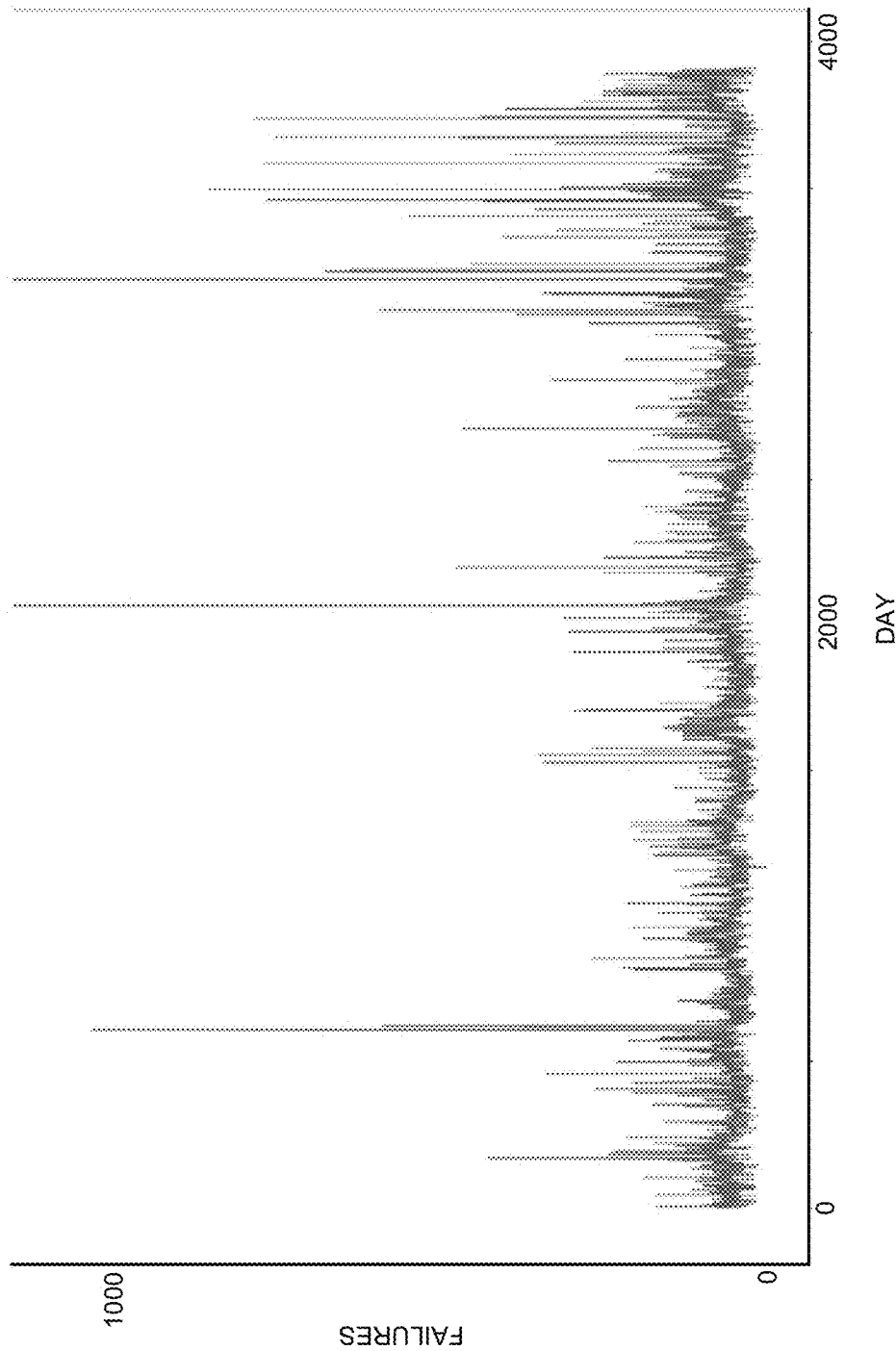
FIG. 3A presents a graph illustrating raw failures per day in accordance with the disclosed embodiments.
Figure 3B:
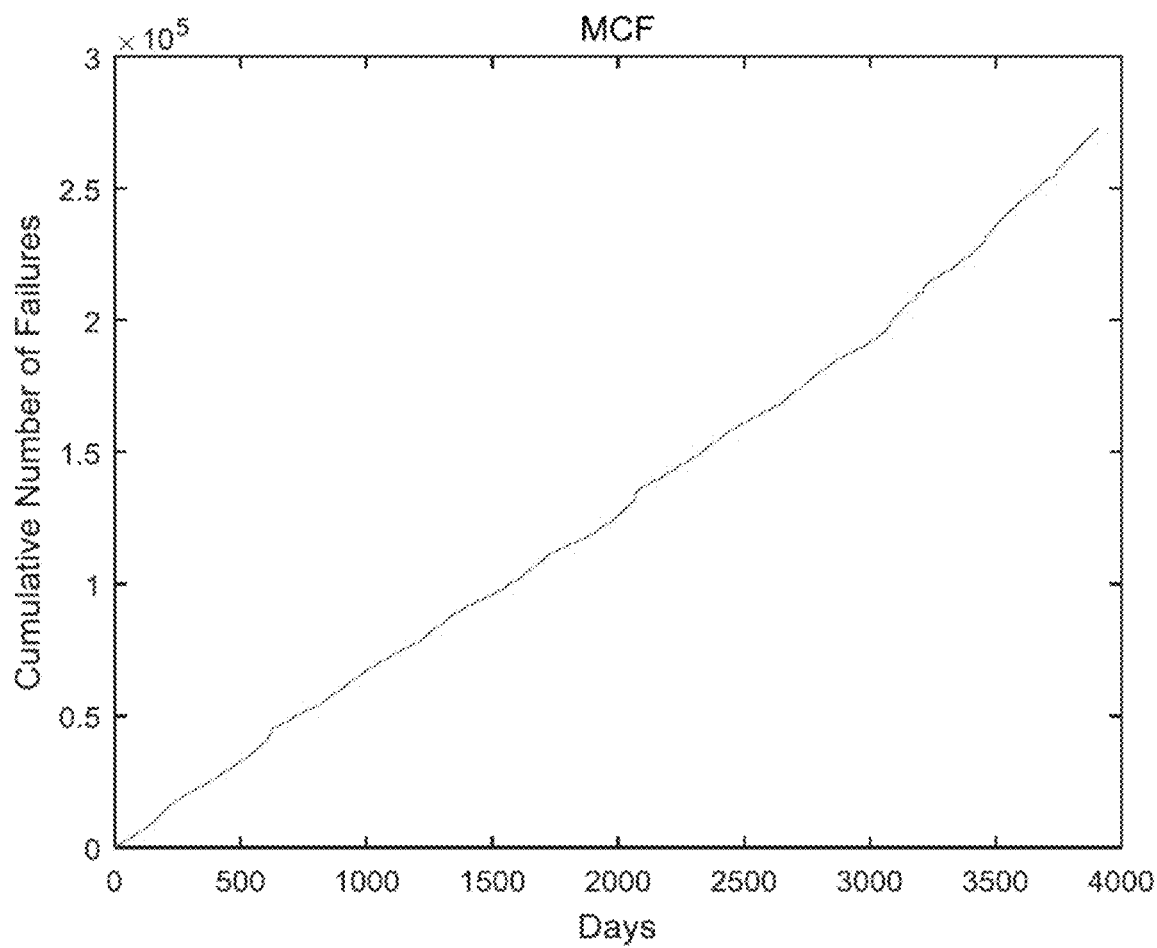
FIG. 3B presents a graph illustrating cumulative failures per day in accordance with the disclosed embodiments.

In an example involving a fairly large dataset, FIG. 3A illustrates raw counts for failures per day across a large population of assets. In this example, we compute the MCF for this population of assets to produce the graph that appears in FIG. 3B.

Figure 3C:
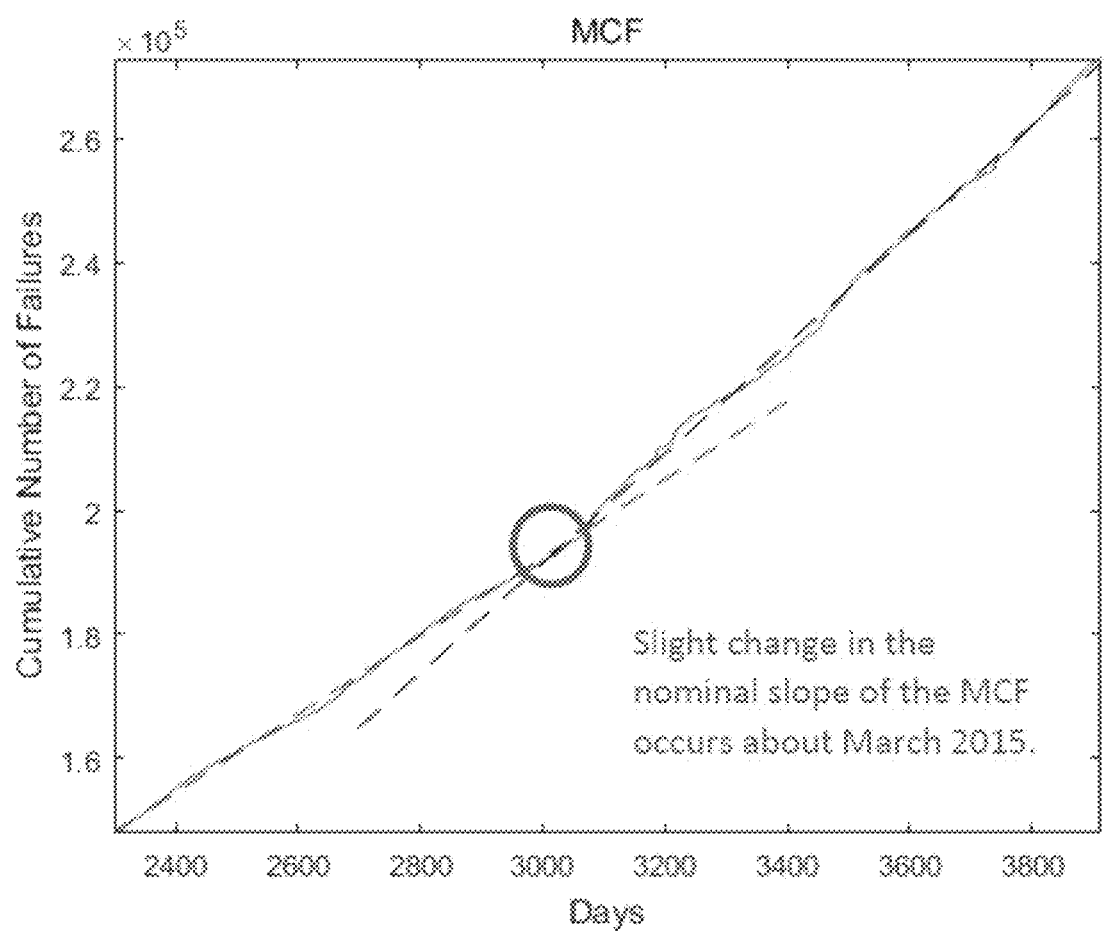
FIG. 3C presents a graph illustrating cumulative failures per day with a change in slope in accordance with the disclosed embodiments.

Before proceeding further, there is one interesting characteristic that appears in the zoomed-in portion of the MCF curve that appears in FIG. 3C. There appears to be a slight "elbow" in the MCF curve at about 3100 days (at about March 2015) in the plot in FIG. 3C. This is something that can happen when there is a sudden change in the total population of assets. Note that FIG. 3C shows that the baseline slope of the MCF is remarkably constant before about 3100 days in the 10-yr history file, and also remarkably constant after the "elbow" in the curve at about 3100 days. This change in baseline slope in no way affects the approach for inferring "weather triangulated" risk indices (RIs) because the RIs are inferred from localized numerical derivatives. "Elbows" in long term MCFs occur when a utility acquires new grid regions, or "downward elbows" occur when a utility sells off a portion of its grid to another utility.

Figure 4:
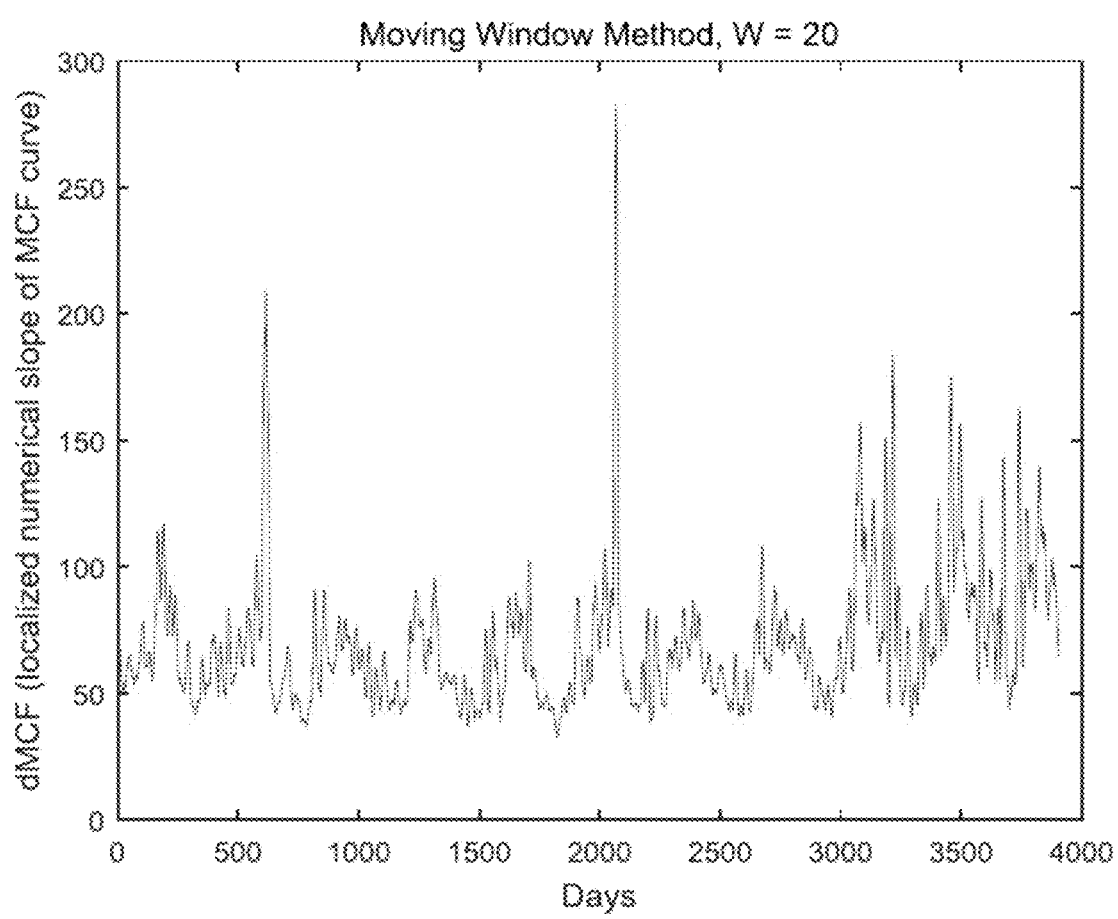
FIG. 4 presents a graph illustrating the derivative of the aggregate Mean Cumulative Function (MCF) in accordance with the disclosed embodiments.

Note that "bumps" occur in the MCF curve when there are bad weather events. However, there is no need to carefully examine the MCF curve to spot these "bumps." We can instead use an analytical technique that takes a moving-window localized numerical derivative of the MCF curve over a 4000-day period to produce the dMCF curve that appears in FIG. 4. Note that the "bumps" in the MCF curve in FIG. 3C become extremely obvious in the corresponding dMCF curve in FIG. 4.

From the theory of MCF analyses, we know that when failures are random in time (what we call "blue sky" failures), the MCF has a constant slope. Note that "blue sky" failures have random inter-arrival times between failures, which, for example, can be caused by a truck hitting a utility pole, a squirrel chewing through the insulator on a high-voltage transmission line, or even an "end of life" failure of an aging asset. For the utility distribution grid analysis, we have shown empirically with actual historical failure data that the "blue sky slope" of the MCF curve is remarkably constant with time.

However, when there are increased stresses on the assets, there are increased failures, which show up as peaks in the dMCF curve. For example, these external stress factors can include: high winds; high temperatures that can cause thermal-accelerated degradation in electronic and electromechanical systems; very high relative humidity, which can cause internal condensation during sudden temperature drops, and can lead to internal shorting; very low relative humidity, which can lead to arcing failures in assets with high potential-difference gradients between parallel conductors; and heavy precipitation, which can accelerate tree-branch failures in warm environments and snow- and ice-related failures in cold environments. The increased asset failure rates caused by these increased stresses show up as a change in the "moving-window" slope of the dMCF curve.

Figure 5:
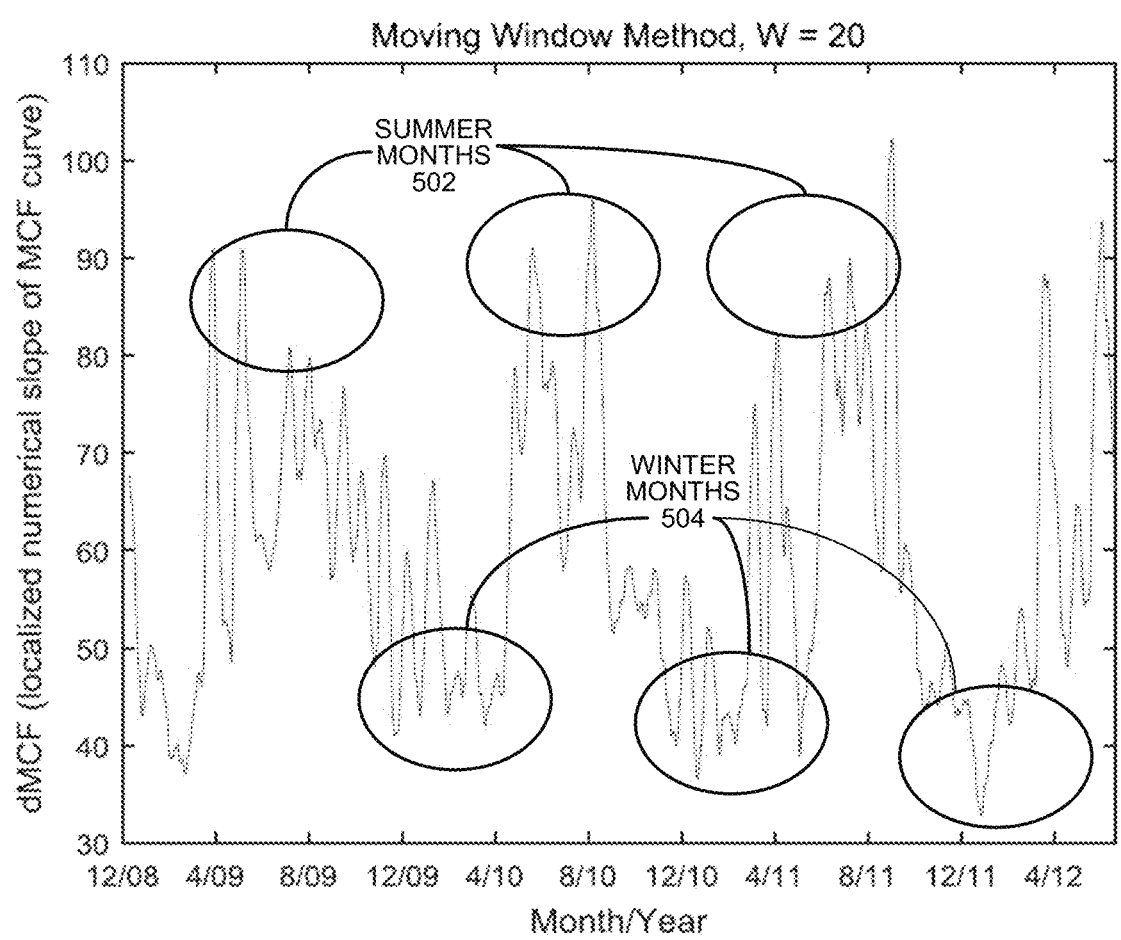
FIG. 5 presents a graph illustrating the derivative of the aggregate MCF highlighting summer months and winter months in accordance with the disclosed embodiments.

FIG. 5 focuses in on a typical three-year period for a utility company located in the southern United States to examine more closely the dynamics of the moving-window dMCF. Note that that during the summer months 502, asset failure probabilities are higher and more erratic. Conversely, during winter months 504, asset failure probabilities are lower and less erratic. These patterns are typically reversed for northern utilities.

Barycentric Coordinate Technique (BCT)

The BCT is a spatial-graph, analytical-geometry technique, which has been previously used to perform acoustic triangularization of the locations of degrading disk drives, and to facilitate anti-counterfeiting of pharmaceuticals. However, the BCT has not previously been used to facilitate optimal resource allocation for utilities during weather events.

To apply BCT to optimal utility resource allocation during such weather events, we first create a large database of utility system assets with latitude and longitude coordinates, and a second large database of weather feeds located throughout the region served by the utility (typically more than 10,000 square miles for average utilities) also with latitude and longitude coordinates.

Note that a naïve approach to determining failure probabilities is to "weight" the failure probabilities of the assets using the closest weather feed based on the Euclidian distance of each asset to its nearest weather feed. The problem with this naïve approach is that it is extremely challenging to incorporate "weather direction" into a simple closest-Euclidian-distance weighting function. Note that weather direction encompasses not only the instantaneous wind direction, but also the movement of weather systems through the region.

Instead of simply using Euclidean distance, the new BCT-triangularized-weather-weighting function provides a computationally efficient technique for weighting each asset based on a smallest bounding triangle of weather feeds.

Empirical results show that this new innovation is extremely robust in correlating asset failure probabilities to localized weather conditions, regardless of instantaneous wind directions or directions of the macroscopic movement of a weather system through a region.

In the weather-feed database, we permute the latitude and longitude indices to create all possible triangles whose vertices coincide with weather feeds. The technique then steps through the asset database and selects each asset, one at a time, and the BCT technique is used to efficiently compute all possible triangles for the asset from the weather feeds.

We now provide a simple example, which shows how we set up the iterative spatial-graph geometry. In this example, weather feeds 1, 2, and 3 have the following latitude and longitude coordinates, $(x_1, y_1)$, $(x_2, y_2)$ and $(x_3, y_3)$. Moreover, the asset considered each time through the outer loop is presented by M with coordinates (x, y).

Figure 6:
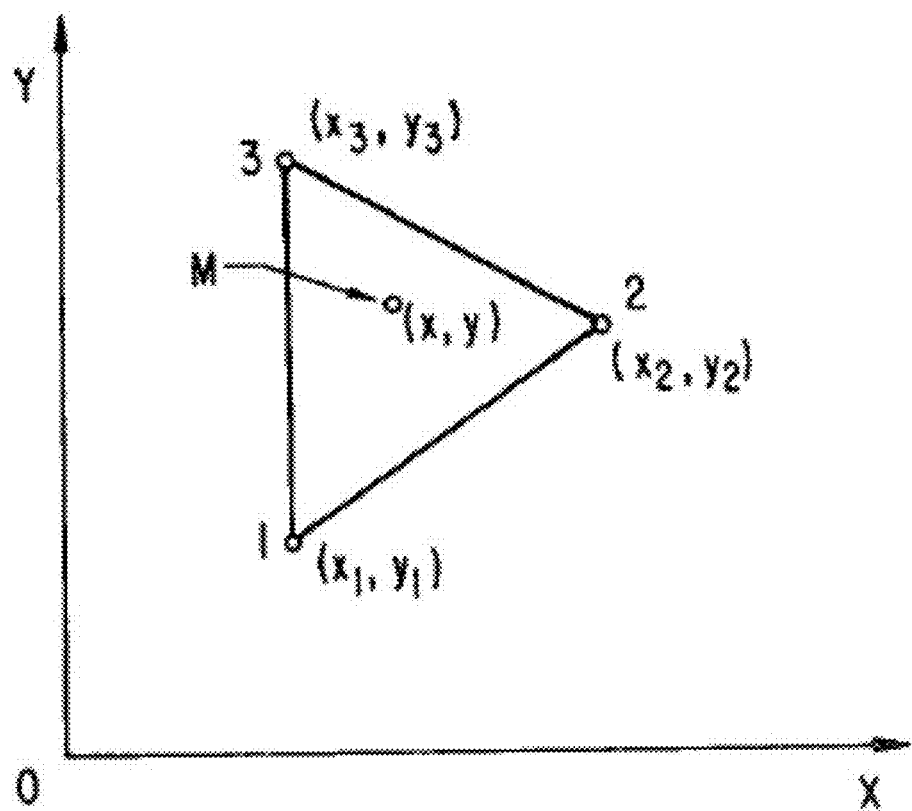
FIG. 6 presents a graphical representation of the BCT technique in accordance with the disclosed embodiments.

The BCT enables us to efficiently translate from a Cartesian coordinate system into a new barycentric coordinate system by starting with the following equations, which treat M as a vector [x, y] and form a linear combination of M as a function of the vectors representing the weather-feed nodes. (This is illustrated in FIG. 6.) The matrix math presented in FIG. 6 is extremely efficient for iterative analyses, and the output each time through the loop (namely, the $C_3$ vector comprising elements $c_1$, $c_2$, and $c_3$ illustrated in FIG. 7) tells us everything we need to know to quickly identify the smallest triangle of weather feeds enveloping each asset in the utility distribution grid.

Figure 8:
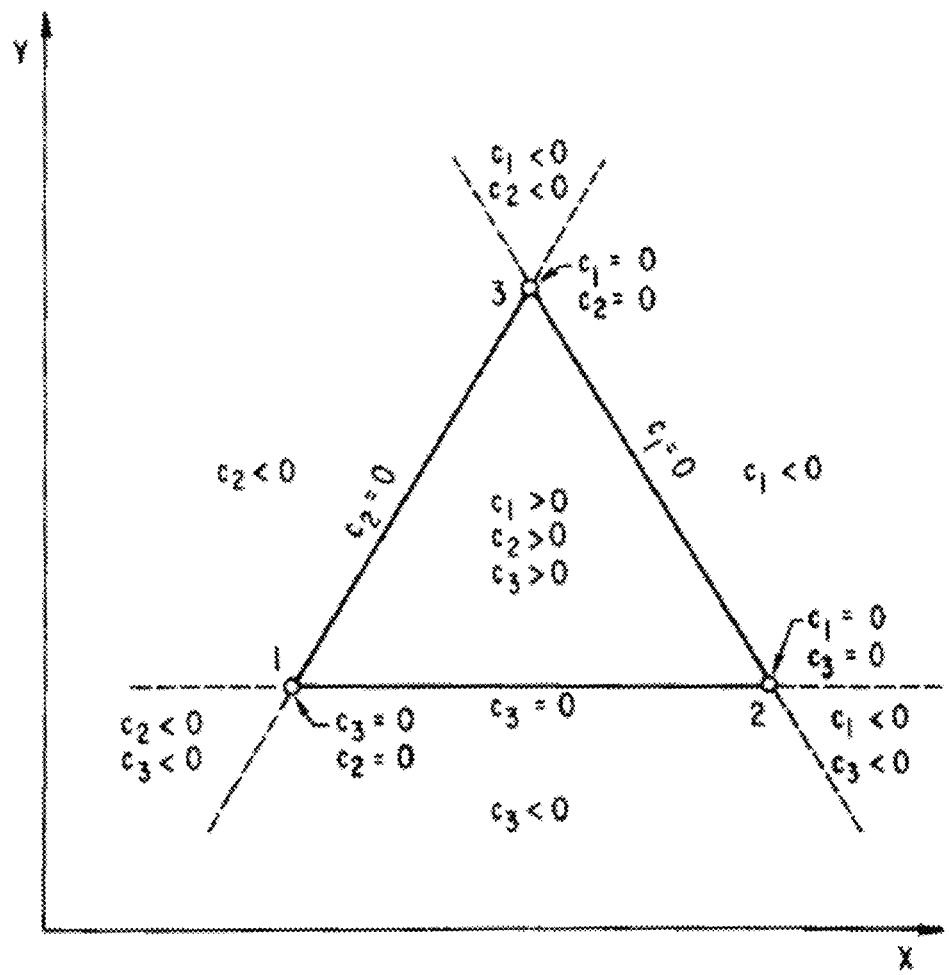
FIG. 8 illustrates values taken by components of the $C_3$ vector in various regions of the simplex plane in accordance with the disclosed embodiments.

If there were an unusual geographical position for any individual assets (e.g., on a coast or a small peninsula) such that there are no triangles of weather feeds around those assets, the technique very quickly and automatically identifies that using the mapping shown in FIG. 8. Hence, the technique automatically determines when an asset is outside the "edge" of a triangle of weather feeds, and if so uses a bivariate weighting of the two nearest weather feeds. In the rare case where an asset is not near an edge connecting two weather feeds, but is "beyond a vertex" in the context of the BCT mapping below (i.e., two components of the $C_3$ vector are negative), then the Euclidian distance to a single nearest weather feed is used as the weighting function for the asset. Note that through each iterative cycle of the spatial-graph loop with BCT, only one small matrix computation is required to produce the $C_3$ vector, the components of which are the weighting functions for that asset to the closest surrounding triangle of weather feeds.

There is an additional, important step in the BCT iterations. With large numbers of weather feeds located across a region spanned by a utility distribution grid (typically many thousands of square miles), there will be multiple triangles of weather feeds enclosing each asset. In this case, we want to select both the smallest triangle and the most symmetric triangle. For this additional step in the BCT iterations, we compute the area of every triangle identified in the previous step to enclose a given asset, and then rank the areas to identify "feasible triangles" that are the smallest. We then pick the one that fits into the smallest-radius circumscribed circle that intersects the vertices of the smallest area triangles enclosing each asset. Note that by eliminating "feasible triangles" that have a small area but a large enclosing circle, we avoid the circumstance where an enclosing triangle might have a very long base, but a very small hypotenuse. Such a situation could arise and can cause a triangle's area to be small when two of the weather feeds are quite distant from the asset. Hence, the technique for selecting bounding triangles for the BCT iterations is based on dual "goodness" metrics comprising (1) a small triangular area, and (2) a small-radius circumscribing circle assures the highest correlation factors for our "localized triangulated weather-weighting functions."

Figure 9:
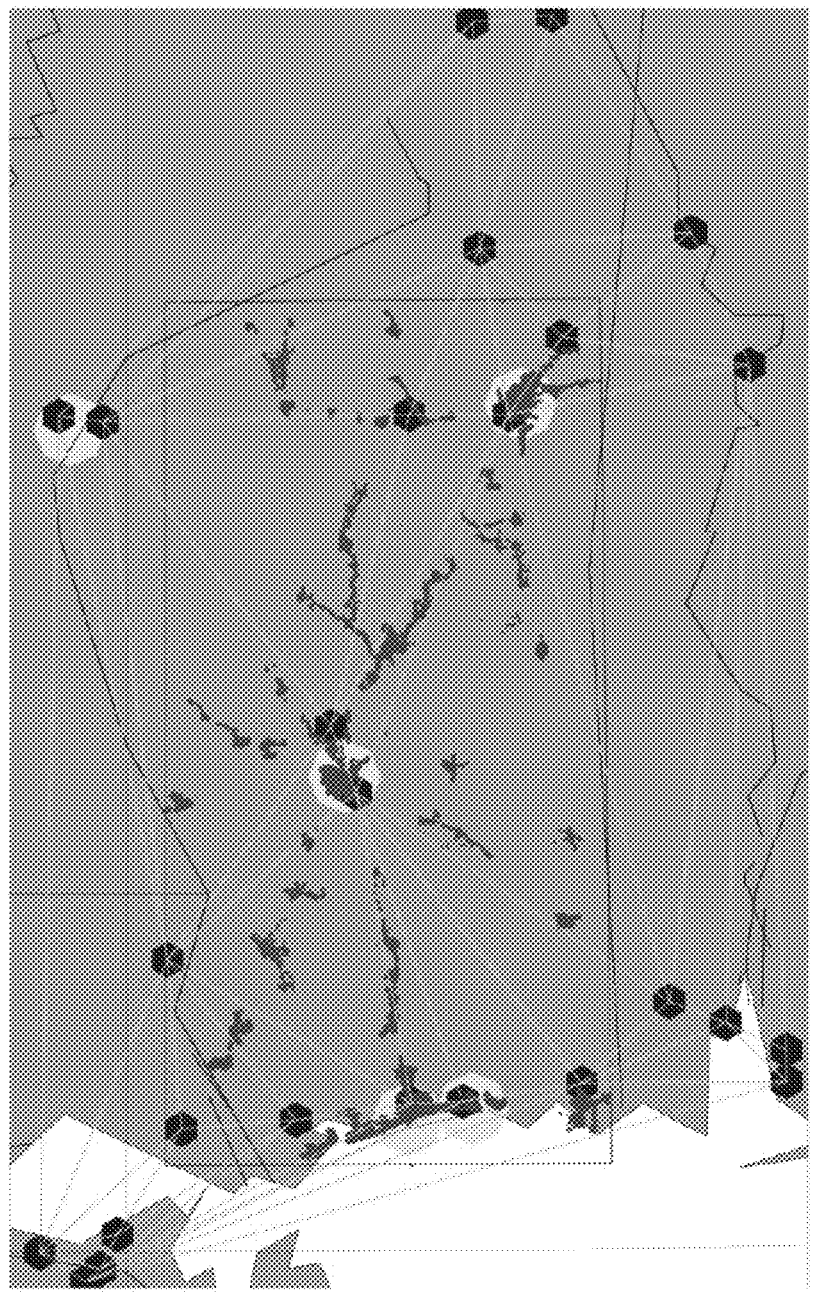
FIG. 9 illustrates various assets in an exemplary utility grid in accordance with the disclosed embodiments.

FIG. 9 illustrates the new BCT technique applied to a section of the utility grid containing many assets (illustrated as green dots), several failed assets (illustrated as red dots) and multiple weather feed locations (illustrated as blue hexagons). The cyan triangles shown in FIG. 9 represent the numerous feasible bounding triangles determined from the BCT iterations. Note that in each case the triangle with the smallest area and the smallest circumscribing circle is selected by the technique to facilitate weather weighting of the empirically inferred asset risk indices for the assets.

There is another important aspect of this approach. If we knew the mean time before failure (MTBF) for each asset, we could use this knowledge in our overall modeling process. However, not knowing the MTBF of the individual assets does not hurt the process. The reason for this is that in the absence of weather-stress-factor elevated risk to assets, when assets fail in accordance with a "baseline" MTBF, the inter-arrival times between failures are an independent and identically distributed (IID) random process. This is the case for individual asset types (e.g., transformers, switches, grid fuses, substations, etc.), and it is also true for aggregates of heterogeneous assets that each have their own MTBF. Note that the new technique infers this "baseline" inter-arrival time distribution from "blue sky" events (using the baseline slope of the MCF curve described above), and then automatically detects deviations in the slope (using the moving-window dMCF analysis) that produce the elevated risk of asset failures during harsh weather conditions.

The final step in the new technique is to overlay the asset risk indices with a network-importance analysis that performs a formal network-reliability analysis for all critical assets that make up the utility distribution grid. This network-importance analysis comprises a generic fault-tolerance analysis for a network of interacting assets, some of which may be interconnected "in parallel," and some of which may be interconnected "in series."

During the network-importance analysis, critical assets are interconnected into a triangular grid, wherein assets are represented by vertices of the triangles, and distribution-path interconnections are represented by edges. During this process, the network-importance analysis assigns "between-ness" and "disconnectivity" weighting metrics to all vertices in the grid, wherein the between-ness metric counts how many paths from a power source to any other node pass through the vertex, and the disconnectivity metric counts how many nodes become disconnected from any power source if the vertex becomes unavailable.

The integration of the foregoing risk indices with the results of the network-importance analysis provides significant advantages for performing optimal resource allocation during severe storm events. For example, consider two identical transformers A and B in the grid, which are located in regions that are likely to be impacted by an approaching storm. Suppose that the two identical transformers A and B are both assigned a quantitative risk index of 0.95, but the network-importance analysis reveals that transformer A is "fault tolerant" in the grid architecture and may only impact a one-block area if it fails, whereas transformer B is located in a region of the grid where its failure can cause a series cascade of downstream failures, which could take out a 10-square-mile region containing tens of thousands of homes. In this case, the emergency response center would proactively direct a repair crew to transformer B instead of transformer A to prevent the possible cascade of downstream failures.

We now describe details of an exemplary utility system that can benefit from the above-described technique.

Exemplary Utility System

FIG. 1 illustrates an exemplary utility system 100 comprising a set of generating stations 102-104 connected to homes and businesses 110 through an electrical grid 106 in accordance with the disclosed embodiments. Note that generating stations 102-104 can generally include any type of facility that generates electricity, such as a nuclear power plant, a solar power plant, a windmill or a windmill "farm," or a coal-fired, natural gas or oil-burning power plant. Generating stations 102-104 connect into an electrical grid 106, which includes power lines, and which can transfer electricity to homes and businesses 110 within a region served by utility system 100, and can also transfer electricity to and from other utility systems. Note that electrical grid 106 transfers electricity to homes and businesses 110 through substations 107-109.

As illustrated by the arrows in FIG. 1, an ERC computer system 120 receives status information from generating stations 102-104, electrical grid 106, substations 107-109 and homes and businesses 110. It also receives historical failure information 111, historical weather data 112, current weather data 113 and weather forecasts 114. ERC computer system 120 uses these inputs to generate a deployment plan 115 for deploying repair crews, which is ultimately presented to ERC personnel.

Process of Optimizing the Deployment of Repair Crews

Figure 10:
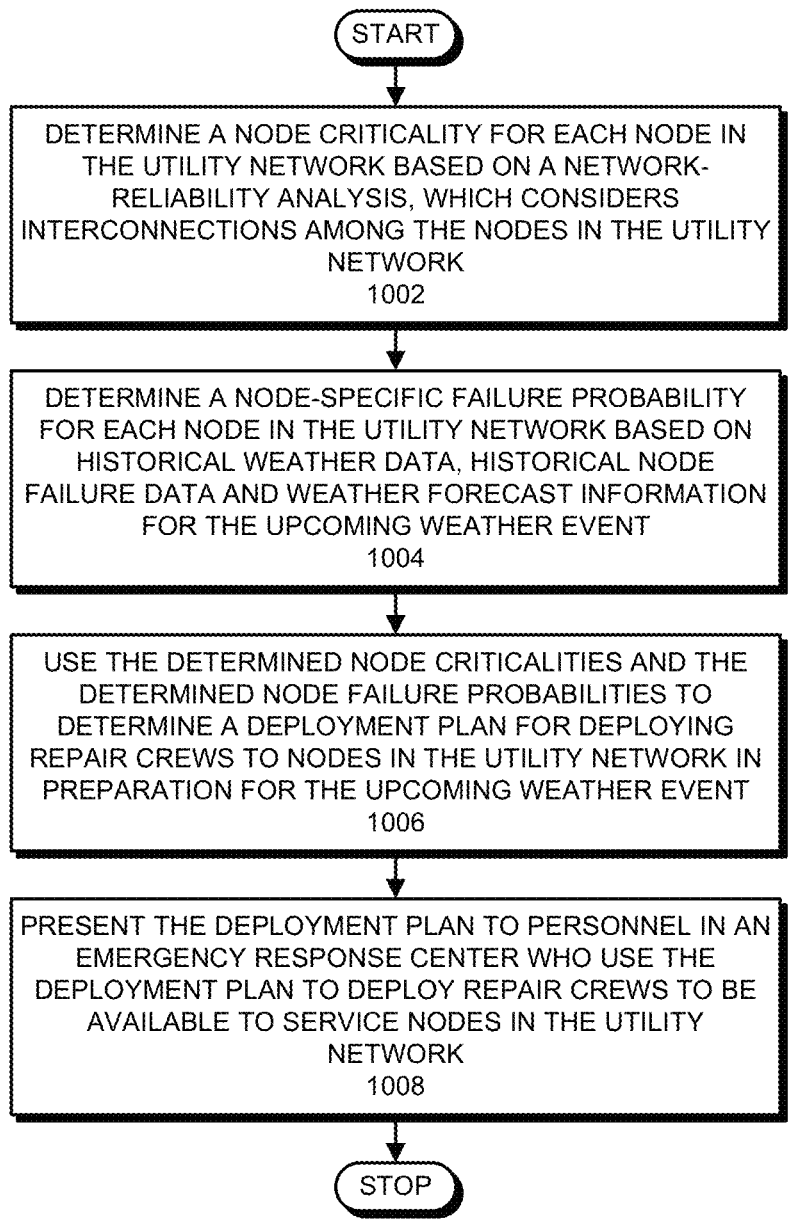
FIG. 10 presents a flow chart illustrating the process of optimizing the deployment of repair crews to nodes in a utility network in accordance with the disclosed embodiments.

FIG. 10 presents a flow chart illustrating the process of optimizing the deployment of repair crews to nodes in a utility network in accordance with the disclosed embodiments. During operation, the system determines a node criticality for each node in the utility network based on a network-reliability analysis, which considers interconnections among the nodes in the utility network (step 1002). The system also determines node failure probabilities for nodes in the utility network based on historical weather data, historical node failure data and weather forecast information for the upcoming weather event (step 1004). Next, the system uses the determined node criticalities and the determined node failure probabilities to determine a deployment plan for deploying repair crews to nodes in the utility network in preparation for the upcoming weather event (step 1006). Finally, the system presents the deployment plan to personnel in an emergency response center who use the deployment plan to deploy repair crews to be available to service nodes in the utility network (step 1008).

Figure 11:
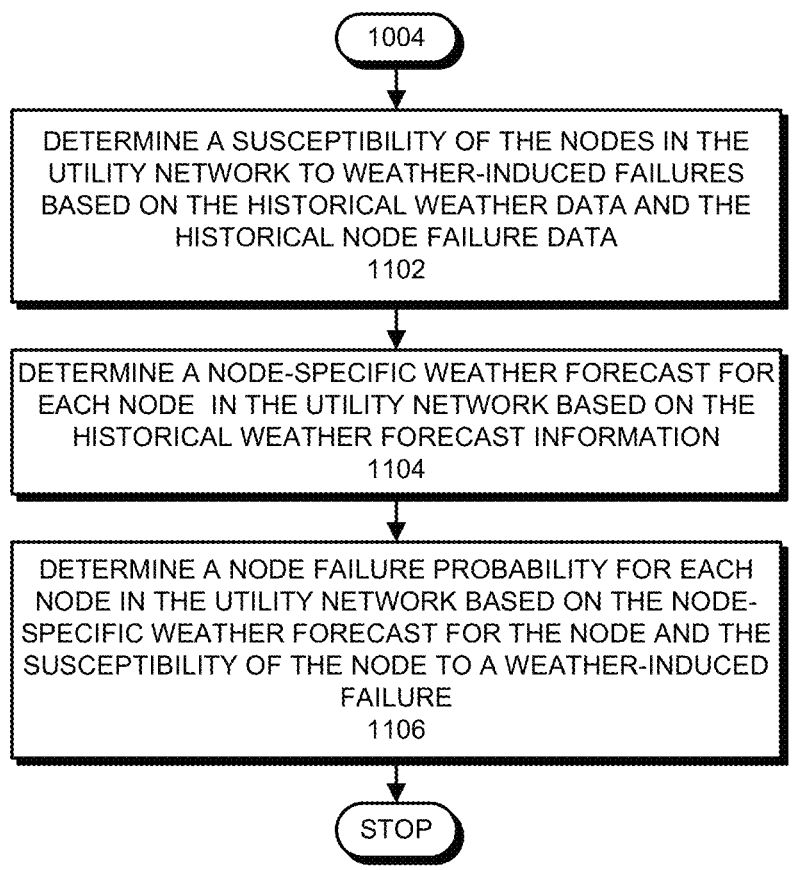
FIG. 11 presents a flow chart illustrating the process of determining a node failure probability for each node in a utility network in accordance with the disclosed embodiments.

FIG. 11 presents a flow chart illustrating the process of determining a node failure probability for each node in a utility network in accordance with the disclosed embodiments. (This flow chart illustrates in more detail the operations that take place in step 1004 in the flow chart in FIG. 10.) First, the system determines a susceptibility of the nodes in the utility network to weather-induced failures based on the historical weather data and the historical node failure data (step 1102). Next, the system determines a node-specific weather forecast for each node in the utility network based on the historical weather forecast information (step 1104). Finally, the system determines a node failure probability for each node in the utility network based on the node-specific weather forecast for the node and the susceptibility of the node to a weather-induced failure (step 1106).

Figure 12:
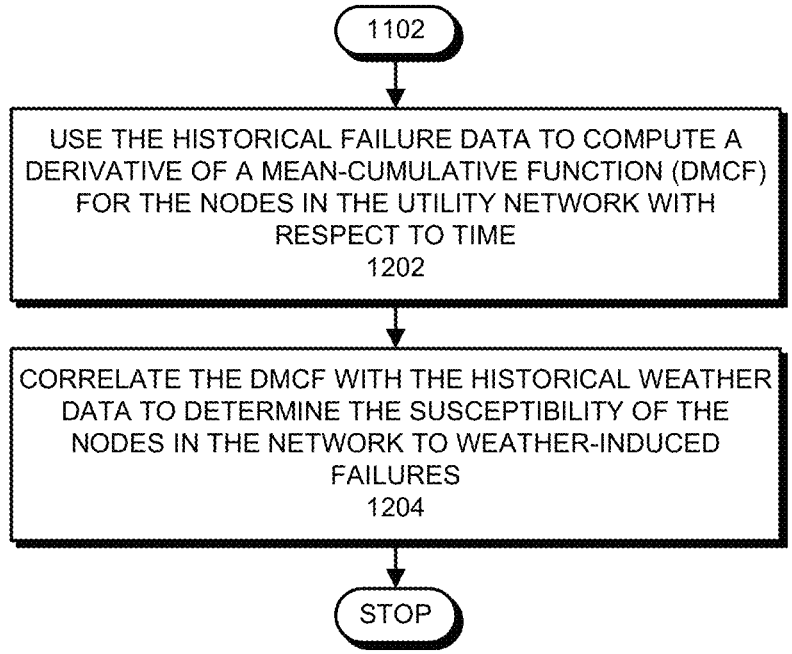
FIG. 12 presents a flow chart illustrating the process of determining a susceptibility of nodes in the utility network to weather-induced failures in accordance with the disclosed embodiments.

FIG. 12 presents a flow chart illustrating the process of determining a susceptibility of nodes in the utility network to weather-induced failures in accordance with the disclosed embodiments. (This flow chart illustrates in more detail the operations that take place in step 1102 in the flow chart in FIG. 11.) First, the system uses the historical failure data to compute a derivative of a Mean Cumulative Function (dMCF) for the nodes in the utility network with respect to time (step 1202). Next, the system correlates the dMCF with the historical weather data to determine the susceptibility of the nodes in the network to weather-induced failures (step 1204).

Figure 13:
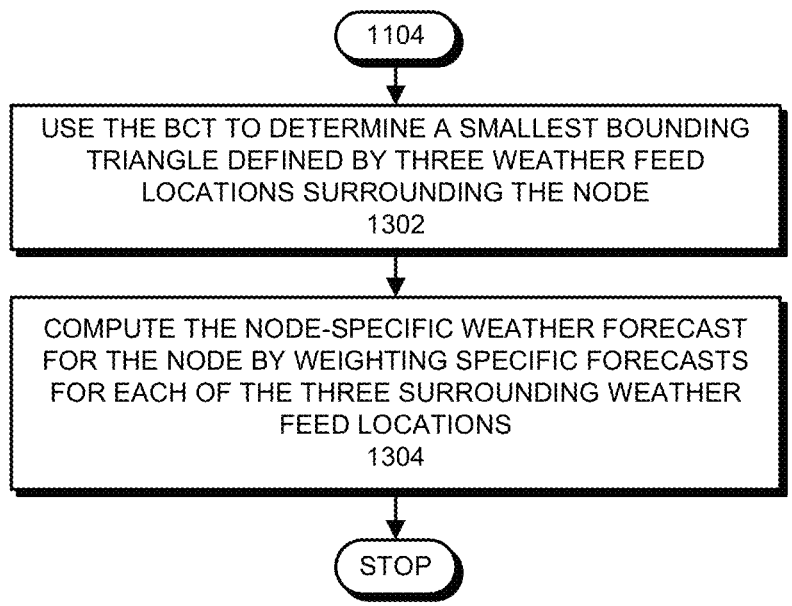
FIG. 13 presents a flow chart illustrating the process of determining a node-specific forecast for a node in accordance with the disclosed embodiments.

FIG. 13 presents a flow chart illustrating the process of determining a node-specific forecast for a node in accordance with the disclosed embodiments. (This flow chart illustrates in more detail the operations that take place in step 1104 in the flow chart in FIG. 11.) First, the system uses the BCT to determine a smallest bounding triangle defined by three weather feed locations surrounding the node (step 1302). Next, the system computes the node-specific weather forecast for the node by weighting specific forecasts for each of the three surrounding weather feed locations (step 1304).

Deployment Process Overview

Figure 14:
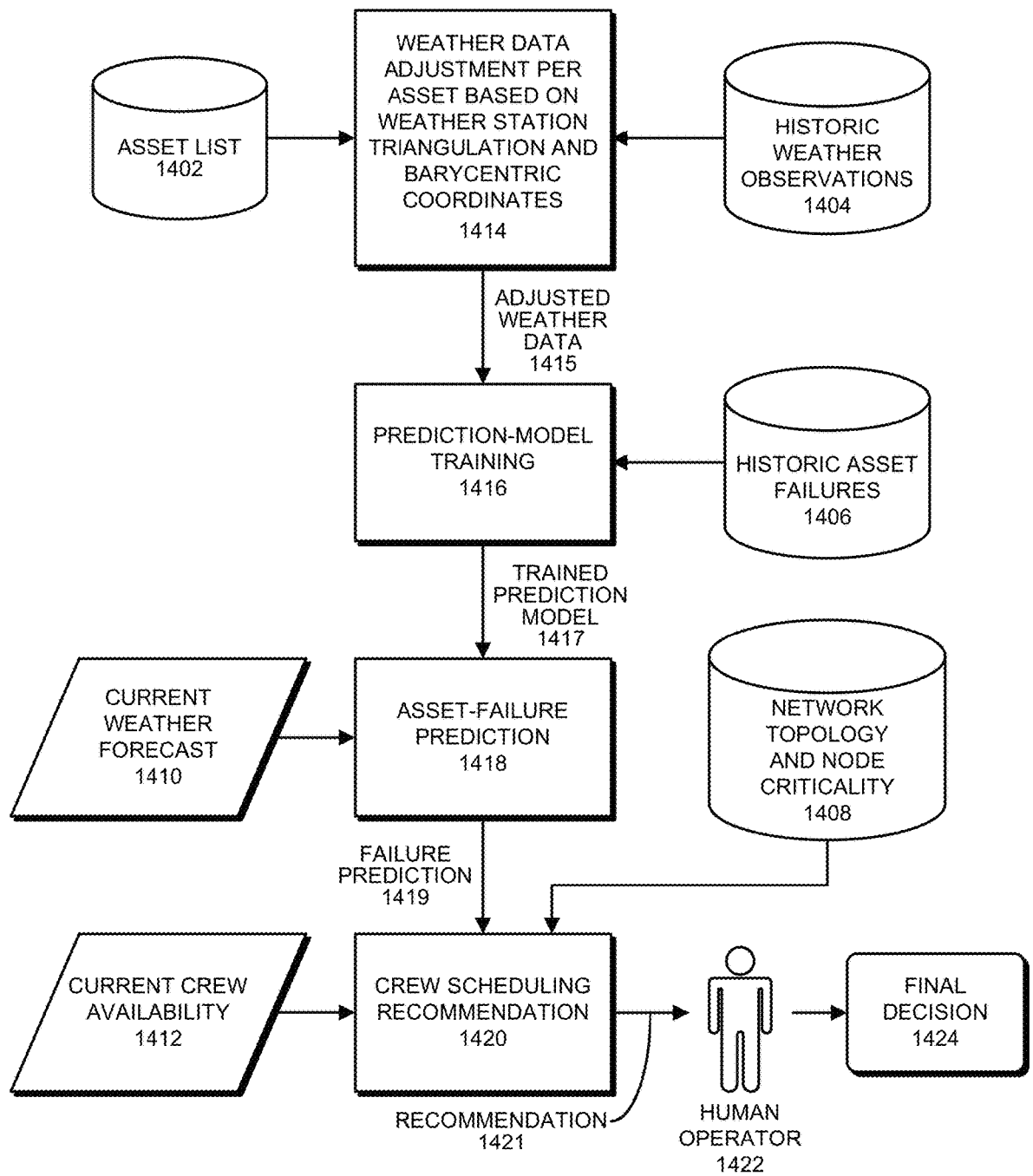
FIG. 14 presents a flow diagram of the process of deploying utility repair crews in accordance with the disclosed embodiments.

FIG. 14 presents a flow diagram illustrating the process of deploying utility repair crews in accordance with the disclosed embodiments. At the start of this process, an asset list 1402 and historic weather observations 1404 are fed into an adjustment module 1414, which performs a "weather data adjustment per asset" operation based on weather station triangulation and barycentric coordinates to produce adjusted weather data 1415. This adjusted weather data 1415 feeds into a prediction-model training module 1416, which generates a trained prediction model 1417 based on the adjusted weather data 1415 and also on information from a database of historical asset failures 1406. This prediction model 1417 feeds into an asset-failure prediction module 1418, which generates a failure prediction 1419 for utility system assets based on the prediction model 1417 and a current weather forecast 1410. Failure prediction 1419 feeds into a crew-scheduling-recommendation module 1420, which produces a recommendation 1421 for scheduling repair crews based on: the failure prediction 1419, current crew availability 1412, and information from a network topology and node criticality database 1408. Finally, this recommendation 1421 is presented to a human operator 1422 who uses recommendation 1421 to make a final decision 1424 about deployment of utility repair crews.

Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for facilitating deployment of utility repair crews to nodes in a utility network in preparation for an upcoming weather event, comprising:

configuring multiple nodes in the utility network for conducting electricity to consumers;

electronically storing historical node failure data identifying failures of nodes among the multiple nodes;
electronically storing historical weather data identifying weather conditions during the past failures;
for each node in the multiple nodes, calculating a node criticality based on a network-reliability analysis and interconnections among the multiple nodes;
for each node in the multiple nodes, calculating a node failure probability by:
  determining a susceptibility of the node to weather-induced failures based on the historical weather data and the historical node failure data,
  determining a node-specific weather forecast for the node based on the weather forecast information, and
  determining the node failure probability based on the node-specific weather forecast and the susceptibility of the node to a weather-induced failure;
using the calculated node criticalities and node failure probabilities to generate a deployment plan for deploying repair crews to one or more of the multiple nodes in preparation for the upcoming weather event; and
displaying the deployment plan to personnel in an emergency response center who use the deployment plan to deploy the repair crews.

2. The method of claim 1, wherein the deployment plan deploys repair crews to critical nodes that are likely to fail.

3. The method of claim 2, wherein the deployment plan deploys repair crews to nodes in a manner that minimizes an expected criticality of nodes that are not covered by a repair crew.

4. The method of claim 1, wherein determining the susceptibility of the node to weather-induced failures comprises:
  using the historical node failure data to compute a derivative of a Mean Cumulative Function (dMCF) for the node with respect to time; and
  correlating the dMCF with the historical weather data to determine the susceptibility of the node to weather-induced failures.

5. The method of claim 4, wherein:
  the dMCFs are computed differently for each different type of node; and
  the susceptibility to failure is computed differently for each different type of node.

6. The method of claim 5, wherein the different types of nodes in the utility network include:
  generating plants;
  transmission lines; and
  transformers.

7. The method of claim 1, wherein:
  the weather forecast information comprises specific weather forecasts for geographically distributed weather feed locations; and
  determining the node-specific weather forecasts for the node based on the weather forecast information comprises:
    using the barycentric coordinates technique (BCT) to determine a smallest bounding triangle defined by three weather feed locations surrounding the node, and
    computing the node-specific weather forecast for the node by weighting specific forecasts for each of the three surrounding weather feed locations.

8. The method of claim 7, wherein if the node is not surrounded by a bounding triangle of weather feed locations, the node-specific weather forecast for the node is computed by weighting specific forecasts for each of one or two nearest weather feed locations.

9. The method of claim 1, wherein the node criticality for the node is determined based on:
  how many paths from a power source to any other node pass through the node; and
  how many nodes become disconnected from a power source if the node fails.

10. A utility network, comprising:
  multiple nodes for conducting electrical power to consumers, wherein each node is coupled to at least one other node;
  historical node failure data identifying past failures of nodes among the multiple nodes;
  historical weather data identifying weather conditions during the past failures; and
  one or more computer systems having one or more processors, associated memory, and a display, wherein the one or more processors execute instructions for performing a method comprising:
    for each node in the multiple nodes, calculating a node criticality based on a network-reliability analysis and interconnections among the multiple nodes;
    for each node in the multiple nodes, calculating a node failure probability by:
      determining a susceptibility of the node to weather-induced failures based on the historical weather data and the historical node failure data,
      determining a node-specific weather forecast for the node based on the weather forecast information, and
      determining the node failure probability based on the node-specific weather forecast and the susceptibility of the node to a weather-induced failure;
    using the calculated node criticalities and node failure probabilities to generate a deployment plan for deploying repair crews to one or more of the multiple nodes in preparation for the upcoming weather event; and
    displaying the deployment plan to personnel in an emergency response center, on the display, wherein the personnel use the deployment plan to deploy the repair crews.

11. The utility network of claim 10, wherein the deployment plan deploys repair crews to critical nodes that are likely to fail.

12. The utility network of claim 11, wherein the deployment plan deploys repair crews to nodes in a manner that minimizes an expected criticality of nodes that are not covered by a repair crew.

13. The utility network of claim 10, wherein while determining the susceptibility of the node to weather-induced failures, the method further comprises:
  using the historical failure data to compute a derivative of a Mean Cumulative Function (dMCF) for the node with respect to time; and
  correlates the dMCF with the historical weather data to determine the susceptibility of the node to weather-induced failures.

14. The utility network of claim 13, wherein:
  dMCFs are computed differently for each different type of node; and
  the susceptibility to failure is computed differently for each different type of node.

15. The utility network of claim 10, wherein:
the weather forecast information comprises specific weather forecasts for geographically distributed weather feed locations; and
while determining the node-specific weather forecast for the node based on the weather forecast information, the system:
uses the barycentric coordinates technique (BCT) to determine a smallest bounding triangle defined by three weather feed locations surrounding the node, and
computes the node-specific weather forecast for the node by weighting specific forecasts for each of the three surrounding weather feed locations.

16. The utility network of claim 15, wherein if the node is not surrounded by a bounding triangle of weather feed locations, the system computes the node-specific weather forecast by weighting specific forecasts for each of one or two nearest weather feed locations.

17. The utility network of claim 10, wherein the system determines the node criticality for each node based on:
how many paths from a power source to any other node pass through the node; and
how many nodes become disconnected from a power source if the node fails.

18. A non-transitory computer-readable storage medium storing instructions that when executed by a computer cause the computer to perform a method for facilitating deployment of utility repair crews to nodes in a utility network, the method comprising:
mapping multiple nodes in the utility network for conducting electricity to consumers;
electronically storing historical node failure data identifying failures of nodes among the multiple nodes;
electronically storing historical weather data identifying weather conditions during the past failures;
for each node in the multiple nodes, calculating a node criticality based on a network-reliability analysis and interconnections among the multiple nodes;
for each node in the multiple nodes, calculating a node failure probability by:
determining a susceptibility of the node to weather-induced failures based on the historical weather data and the historical node failure data,
determining a node-specific weather forecast for the node based on the weather forecast information, and
determining the node failure probability based on the node-specific weather forecast and the susceptibility of the node to a weather-induced failure;
using the calculated node criticalities and node failure probabilities to generate a deployment plan for deploying repair crews to one or more of the multiple nodes in preparation for the upcoming weather event; and
displaying the deployment plan to personnel in an emergency response center who use the deployment plan to deploy the repair crews.

19. The method of claim 1, further comprising:
presenting a visual representation of the utility network, including each node; and
displaying in the visual representation, for each of one or more nodes, one or more corresponding closed bounding polygons representing probable weather as forecast by multiple weather feeds.

20. The method of claim 19, further comprising, for each node for which multiple corresponding polygons are displayed:
compute the area of each polygon;
determining the smallest circumscribe circle that intersects all vertices of the polygon; and
retaining only the polygon with the smallest circumscribing circle.

* * * * *

UNITED STATES PATENT AND TRADEMARK OFFICE
CERTIFICATE OF CORRECTION

| | |
|---|---|
| PATENT NO. | : 11,010,694 B2 |
| APPLICATION NO. | : 15/938988 |
| DATED | : May 18, 2021 |
| INVENTOR(S) | : Gross et al. |

It is certified that error appears in the above-identified patent and that said Letters Patent is hereby corrected as shown below:

In the Specification

In Column 6, Line 31, delete "in on" and insert -- on --, therefor.

In Column 6, Line 34, delete "that that" and insert -- that --, therefor.

In the Claims

In Column 12, Line 9, in Claim 10, delete "network ," and insert -- network, --, therefor.

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*